United States Patent Office 3,193,537
Patented July 6, 1965

3,193,537
PROCESS FOR THE PRODUCTION OF ACRYLO-
NITRILE POLYMERS IN THE PRESENCE OF A
DICARBOXYLIC ACID AND A METALLIC ION
Karl Dinges, Cologne-Stammheim, and Herbert Marzolph,
Dormagen, Germany, assignors to Farbenfabriken
Bayer Aktiengesellschaft, Leverkusen, Germany, a German corporation
No Drawing. Filed Nov. 29, 1961, Ser. No. 155,799
Claims priority, application Germany, Dec. 15, 1960,
F 32,761
10 Claims. (Cl. 260—79.3)

The present invention relates to a process for the production of acrylonitrile polymers having good properties, more specially high thermal stability.

It is known to polymerize acrylonitrile in an aqueous medium, alone or in admixture with other vinyl compounds, with the aid of redox systems based on per compounds and sulphur compounds of low oxidation stages at pH values below 7 and with or without the use of dispersion agents. The polymers obtained in this way serve for the production of shaped articles, such as filaments, fibres and the like. However, such acrylonitrile polymers frequently have too low a thermostability, which can result in a strong yellowing, especially at relatively high temperatures and in the presence of oxygen. This is a particular disadvantage in the production and use of filaments, fibres and films from these polymers. The poor thermostability can be due to various causes. For example, heavy metal ions, such as iron, copper and manganese ions, have a harmful effect. However, also the nature of the acids which are added for achieving a specific pH value in the polymerization mixture is inter alia of importance as regards the thermostability of the polymer.

Furthermore, it is already known to add complex formers for the heavy metal ions in order to reduce the degree of discoloration caused by such ions. It is actually possible in this way to improve the thermostability of acrylonitrile polymers, but the addition of complex formers leads to a strong decrease in the conversion and in a deterioration in the polymerization veloctiy. For these reasons, such processes have not been found to be of industrial interest.

It is known for example that when polymerizing acrylonitrile with the aid of a persulphate and a bisulphite at pH values of about 2 in the presence of oxalic acid (which has a complex-forming action), the conversion after a reaction time of 3½ hours is only 22%. It is only by adding very large quantities of iron ions that a normal polymerization conversion is obtained (see Journal of Polymer Science, 32, 413 (1958)). However, polymers which were prepared with such high iron ion concentrations (for example 1% of iron sulphate, calculated on acrylonitrile), have a very poor thermostability, irrespective of whether oxalic acid is present or not during the polymerization.

Owing to the property of oxalic acid to have a polymerization-inhibiting action, it has already been proposed to use oxalic acid or water-soluble oxalates for stopping vinyl polymerization. Thus, the addition of only 0.15 mmol of oxalic acid per mol of monomer prevents the further polymerization of an acrylonitrile/vinyl acetate mixture (see German Patent No. 1,083,050).

It is also known to carry out the polymerization of acrylonitrile in aqueous solution in the presence of a persulphate, a water-soluble sulphur compound of low oxidation stage and such a large quantity of oxalic acid that a pH value of 1–3 and advantageously 1.5–2.0 is reached. Heavy metal ions are not present during this polymerization process. No useful products are obtained outside this pH range. The solutions of these polymers in dimethylformamide show an improved light transmission, especially in the blue region of the spectrum, but after heating the solution for 5 minutes as 100° C., the improvement over comparison samples is still only very slight (see United States Patent 2,629,711).

With this process, large quantities of oxalic acid are required (10 parts by weight of oxalic acid to 100 parts by weight of acrylonitrile); furthermore, comparatively large quantities of persulphate and pyrosulphite must be used. In addition to the economic disadvantages of such a process, the high salt contents used, which can also only be removed to an unsatisfactory degree by intensive washing from the polymer, lead to discolorations of the spinning solutions. Moreover, in accordance with the data given in the single example of the United States Patent, only comparatively slow polymerization velocities are produced. Finally, the thermostability of the products obtained in this way is not appreciably improved, even in relation to the indicated comparison samples.

The single example of United States Patent 2,629,711 has been carried out repeatedly and it has been found that conversions of about 25% at the most are obtained. The polymers have a K-value of about 145. Polymers with such a high K-value cannot be spun from solutions by the conventional methods. The results of copying the said example are contrary to the information given in the patent specification. It must however be pointed out in this connection that the results obtained when copying the example correspond very closely with the information referred to above and given in "Journal of Polymer Science," 32, 413 (1958), which is that the addition of oxalic acid results in a very great decrease in the yield. Furthermore, the results also confirm that oxalic acid can be used for stopping vinyl polymerization in accordance with German Patent No. 1,083,050.

It has also been proposed to produce homopolymers of acrylonitrile and copolymers with predominant proportions of acrylonitrile by carrying out the polymerization in the absence of iron and other heavy metal ions in aqueous solution in the presence of per compounds, reducing agents, phosphoric acid or pyrophosphoric acid and small quantities of copper ions. These products have a very good thermostability, but it is necessary with this process to work with apparatus made of glass, enamel or other materials free from heavy metal, and this in certain circumstances can lead to difficulties in the art (see German Patent No. 1,040,242).

In accordance with the present state of the art, it is thus possible to stop polymerization of acrylonitrile by means of oxalic acid. It has however not so far been possible for polymers of acrylonitrile to be produced with substantially improved thermostability in a process which can be carried out industrially, in the presence of oxalic acid. According to the known processes, the yield and the polymerization velocity are too low and the K-value is too high.

One object of the present invention is to provide a new process for the production of acrylonitrile polymers. One particular object thereof is to provide a new process which can also be carried out in apparatus containing iron. Yet another object is to be seen in the fact that simplest possible additives are required during the polymerization and these are also only required in small quantities. Finally, yet another object of the invention is to produce good yields and permit the production of acrylonitrile polymers which have a high thermostability. Other objects will be apparent from the following description and the examples.

It has now been found that if in the process for the polymerization of acrylonitrile in an aqueous medium at a pH between about 2 and 6 with a redox catalyst system the polymerization is effected in the additional presence of the combination of (a) 0.1–10 mmol, per mol of the total amount of monomer, of an acid selected from the group consisting of oxalic acid, malonic acid and mixtures thereof and (b) a member selected from the group consisting of 0.05 to 20 p.p.m. of copper-II-ions, 0.1 to 40 p.p.m. of tin-II-ions, 0.2 to 80 p.p.m. of mercury-II-ions and mixtures thereof, the amounts given being based on the total amount of monomer, the polymers are obtained in improved yields at higher velocities and have excellent thermostability and color characteristics.

The course of the polymerization in accordance with the invention and also the effects which are produced must be considered as extremely surprising. It was not in any way to be anticipated that when using oxalic acid, only very small quantities of heavy metal ions have to be added when using copper or mercury or tin instead of iron. The oxalic acid then does not stop the polymerization in any way. Furthermore, it is surprising that only quite specific metal ions can be combined with the oxalic acid for the polymerization, namely copper, mercury and tin ions. Other heavy metal salts cannot be used, since in this case the yields obtained are very low. Conversely, it is also surprising that only quite specific acids, namely oxalic acid and malonic acid, can be combined with copper or mercury and tin salts, while other analogous acids lead to low conversions. It is also surprising that just the combination of acid on the one hand and metal on the other hand, leads to high conversions and simultaneously also results in products having particularly good thermostability.

Furthermore, it has surprisingly been found that the high thermostability of the products obtained by this process are also maintained if the polymerization is not carried out in a vessel free from heavy metal, for example a vessel made of glass, enamel, aluminium, etc., but when iron and other heavy metals are not completely excluded, i.e. when polymerization takes place in a vessel made of stainless steel. Furthermore, small quantities of iron ions, such as can for example be entrained by contaminated starting materials into the polymerization vessel, have no disturbing effect in this process and, also within the usual limits, do not cause any deterioration in the thermostability.

The process of the invention is suitable for polymerization of acrylonitrile by itself and also for copolymerization with other ethylenically unsaturated compounds which are copolymerizable with acrylonitrile. All the conventional compounds which are used in the prior art processes of copolymerizing acrylonitrile with ethylenically unsaturated compounds can be used in the process of the invention, since there is no criticality in this respect.

As specific examples of the monomers which preferably are used there may be mentioned: acrylic compounds, such as acrylic and methacrylic acids and esters, vinyl halo-compounds, such as vinyl chloride and vinylidene chloride, further vinyl compounds with aryl groups, such as styrene, unsaturated amides, such as acrylamide and methacrylamide, unsaturated carboxylic acids, unsaturated sulpho acids, such as styrene sulphonic acid and vinyl sulphonic acid. Still further, there may be mentioned vinyl esters such as vinyl acetate and unsaturated disulfonimides. The copolymers normally contain at least 60% and advantageously more than 80% of bound acrylonitrile.

The polymerization in accordance with the invention is itself carried out in the usual manner and water serves as polymerization medium. 600–1000 parts of a salt-free water are added to 100 parts of monomer. The reaction temperatures are between +5 and 70° C., advantageously at 30 to 50° C.

The pH value of the polymerization mixture is between 2 and 6 and preferably at pH 3 to 4.5. It is adjusted to the required value with oxalic acid or malonic acid. It is also possible to adjust the pH value with a combination of oxalic acid and malonic acid or of oxalic acid or malonic acid with suitable mineral acids, such as sulphuric acid or phosphoric acid, or with strong organic acids, such as alkylsulphonic or aryl-sulphonic acids. Hydrochloric and nitric acids are unsuitable in combination with oxalic or malonic acids.

According to the invention, the quantity of the oxalic or malonic acid added is to be within the limits of 0.1 mmol to 10 mmols per mol of total amount of monomers. It is advantageous to use 0.1–1 mmol with oxalic acid and 0.1–3 mmols with malonic acid, related to the monomer in each case. If the two acids are used in quantities smaller than 0.1 mmol, the thermostability of the polymers thereby obtained falls very considerably, whereas when larger quantities (more than 10 mmols) are introduced, there is a deterioration in the yield or the polymerization velocity.

As redox catalyst systems there can be used all systems which comprise as oxidizing components a per compound and as reducing component a sulphur compound of a low oxidation stage. The redox catalyst systems are well known in the art and preferably used in the processes of polymerizing acrylonitrile. As per compounds there may be specifically mentioned alkali metal salts and the ammonium salt of persulfuric acid. Advantageously used as sulphur compounds of a low oxidation stage are alkali metal pyrosulphites, alkali metal thiosulphates and the corresponding ammonium salts. The per compounds are introduced in quantities of 0.3–3%, related to the monomers to be polymerized, and advantageously 0.4–1.5%. The reducing agents are used in quantities of 0.3–6%, advantageously 0.1–3%. The general procedure is to work with a substantially 4-times molar excess of the reducing sulphur compound.

Considered as heavy metal ions for the process according to the invention are copper-II-ions, mercury-II-ions and tin-II-ions. The copper ions are used in quantities of 0.05 to 20 p.p.m., advantageously 0.5 to 1.5 p.p.m., the mercury ions in quantities of 0.2 to 80 p.p.m., advantageously 1.0 to 3.0 p.p.m. and the tin ions in quantities of 0.1 to 40 p.p.m., advantageously 1.5 to 4.5 p.p.m., related to the monomers used in each case. It is also possible to employ mixtures if these ions, in which case the corresponding quantities are added. The heavy metal ions are preferably added in the form of their salts, more especially their sulphates and nitrates.

In a polymerization mixture containing per compounds, a sulphur compound of low oxidation stage and oxalic acid, iron ions cause practically no polymerization, even in quantities of 50 p.p.m. On the other hand, iron ions may be present in the mixture according to the invention in quantities up to about 50 p.p.m. without having any disturbing effect on the polymerization or causing any deterioration in the thermostability of the polymers.

A series of other metal ions, such as those of platinum, rhodium, ruthenium, tungsten, nickel, cobalt and manganese, also cause polymerization of acrylonitrile in the presence of oxalic acid, but the reaction velocities in these cases are very low and the yields which can be produced are generally below 50%. On the other hand, a series of other heavy metal ions, such as cerium and thallium ions, give good yields in the presence of the redox system and oxalic or malonic acid, but the thermo-stabilities of the polymers produced therewith are poor.

If desired, regulators such as aliphatic mercaptans, especially those which contain a hydroxyl group in juxtaposition to the sulphhydryl group, such as thioglycol, can also be used when carrying out the polymerization in accordance with the invention. However, it is in fact an advantage of the process claimed that it is possible therewith to achieve wide ranges of the required molecular weights without using regulators or other additives, merely by varying the quantities of per compound and reducing component.

Moreover, suitable neutral salts, such as sodium or potassium sulphate, sodium or potassium phosphate, sodium or potassium acetate, can also be present in the polymerization mixture according to the invention. Such additives have generally no influence on the thermostability of the polymers.

The process according to the invention has a number of advantages. It can be carried out in apparatus which contain iron, only very simple additives are necessary, and these in small quantities. Good yields are produced and products having high thermostability are obtained.

The polymers and copolymers obtained according to the present invention can be used for the same purposes as the known polymers and copolymers of the same kind, thus for example for the production of synthetic filaments. They show, however, improved properties in that their thermostability is higher and their color number is low.

The invention is further disclosed in the following examples, which are illustrative but not limitative thereof.

*Example 1*

In accordance with the process of the invention, the polymerization is for example carried out in the following:

900 g. of salt-free water and 0.32 g. of oxalic acid are placed in a glass stirrer-type vessel with a capacity of about 2 litres and provided with a thermometer, dropping funnel and reflux condenser, so that a pH value of 3.3 is reached.

After adding 0.737 mg. of copper sulphate $$(CuSO_4 \cdot 5H_2O)$$

1.2 g. of potassium persulphate and 2.4 g. of sodium pyrosulphite are dissolved in the reaction liquid, which is heated to 45° C. The mixture of 178.2 g. of acrylonitrile and 9.3 g. of methyl acrylate, are then run in steadily with 4½ hours. After 1½ hours and after 3 hours, re-activation is carried out with 0.50 g. of potassium persulphate and 1.0 g. of sodium pyrosulphite (each dissolved in 75 g. of salt-free water). After completing the running in of the monomers, stirring is continued for 30 minutes at 40° C., whereafter the substance is filtered off and repeatedly washed with salt-free water. The product is dried at 40° C. in vacuo (corresponds to experiment 4 in the following table).

In the following series of experiments, the process according to the invention is compared with the former state of the art:

| Experiment No. | Oxalic acid, mMol | $Cu^{++}$, p.p.m. | $F^{++}$, p.p.m. | Polymerization period, h. | Yield, percent | K-value | Colour No. |
|---|---|---|---|---|---|---|---|
| 1 | | | 1 | 4.5 | 95 | 90.0 | 15 |
| 2 | | 1 | | 4.5 | 96 | 89.3 | 20 |
| 3 | 58.9 | | | 18 | 20 | 145 | 10 |
| 4 | 1 | 1 | | 4.5 | 96 | 90.5 | 4 |

Experiments 1 and 2 in the table correspond to the conventional polymerization processes, without use of oxalic or malonic acid, but with iron or copper ions. They were carried out as follows:

900 g. of salt-free water and 15 cc. of normal sulphuric acid are placed in a glass stirrer-type vessel with a capacity of about 2 litres and provided with a thermometer, dropping funnel and reflux condenser, so that a pH value of 3.3 is reached.

After adding 0.737 mg. of copper sulphate $$(CuSO_4 \cdot 5H_2O)$$

(experiment 2) or 0.935 mg. of iron sulphate $$(FeSO_4 \cdot 7H_2O)$$

(experiment 1), 0.5 g. of potassium persulphate and 1.0 g. of sodium pyrosulphite are dissolved in the reaction liquid heated to 45° C. The mixture of 178.2 g. of acrylonitrile and 9.3 g. of methyl acrylate are then steadily run in within 4½ hours. After 1½ hours and after 3 hours, reactivation is carried out with 0.2 g. of potassium persulphate and 0.4 g. of sodium pyrosulphite (each dissolved in 75 g. of salt-free water). After completing the running in of the monomers, stirring is continued for 30 minutes at 40° C., whereafter the substance is filtered off and repeatedly washed with salt-free water. The product is dried at 40° C. in vacuo.

Experiment 3 corresponds to a repetition of Example 1 of United States Patent No. 2,629,711.

It is clear from comparison of experiments 1 to 4 that polymers with poor colour numbers are obtained when using iron or copper ion by itself and very low conversions and high molecular weights are obtained when using oxalic acid by itself. It is only the combination according to the invention of oxalic acid with copper ions which leads to high yields with specific K-values and very low colour numbers.

For determining the K-value, see R. Houwink, Chemie und Technologie der Kunststoffe (1956), page 66. The "colour number" is determined in the manner as described in German patent specification No. 1,040,242. In accordance therewith, low numbers indicate good thermostabilities.

*Example 2*

In the following series of experiments, the action of different heavy metal ions on the polymerization of acrylonitrile, alone or in admixture with other vinyl or acryl compounds, in the presence of oxalic acid is compared:

| Experiment No. | Oxalic acid, mMol | Metal ion, p.p.m. | Polym. period, hrs. | Yield, percent | K-value | Colour No. |
|---|---|---|---|---|---|---|
| 5 | 1 | $Fe^{++}$:5 | 12 | traces | | |
| 6 | 1 | $Fe^{++}$:50 | 12 | 15 | 145 | 30 |
| 7 | 1 | $Cu^{++}$:1 | 4.5 | 95 | 92.7 | 4 |
| 8 | 0.5 | $Cu^{++}$:1 | 4.5 | 97 | 91.3 | 4 |
| 9 | 0.25 | $Cu^{++}$:1 | 4.5 | 96 | 90.1 | 4-5 |
| 10 | 1 | $Hg^{++}$:15 | 4.5 | 93 | 107 | 6 |
| 11 | 1 | $Sn^{++}$:6.7 | 4.5 | 90 | 109 | 5-6 |

Experiments 5–11 are carried out as indicated in experiment 4 (polymerization in accordance with the invention), taking into account the above data. In experiments 8 and 9, a pH value of 3.6 is adjusted by adding normal sulphuric acid.

It is clear from the series of experiments that no polymerization or only a small degree of polymerization can be produced even with comparatively large quantities of iron ions. In addition the products are of low thermal stability, when working in the presence of oxalic acid (experiments 5 and 6). In accordance with the process of the invention (experiments 7–11), a rapid and complete polymerization and also thermostable products are obtained.

*Example 3*

In the following series of experiments, the action of different acids on the polymerization of acrylonitrile and if necessary other vinyl compounds in the presence of copper ions is compared.

In principle, the experiments are carried out as experiment 4 in Example 1, but allowing for the data given in the following table:

| Experiment No. | Acid | pH | Cu++, p.p.m. | Yield, percent | K-value | Colour No. |
|---|---|---|---|---|---|---|
| 12 | Sulphuric acid | 2.5 | 0.3 | 96 | 89.5 | 25 |
| 13 | Phosphoric acid | 2.8 | 0.3 | 95 | 88.3 | 25 |
| 14 | Formic acid | 3.0 | 0.3 | 93 | 88.8 | 10 |
| 15 | SO$_2$ | 2.0 | 0.9 | 90 | 91.0 | 35 |
| 16 | Succinic acid | 3.0 | 0.9 | 87 | 112.0 | 15 |
| 17 | Citric acid | 3.2 | 0.9 | 54 | 122.8 | 12 |
| 18 | Oxalic acid | 3.5 | 0.9 | 95 | 90.3 | 4 |
| 19 | Malonic acid | 4.0 | 0.9 | 93 | 91.2 | 6–8 |

In contrast to the former examples, this series of experiments was carried out in a vessel made of stainless steel.

It is to be seen from the results that there is no deterioration in the thermostability with the process according to the invention (experiments 18 and 19) when working in a stainless steel vessel instead of iron-free vessels. However, if acids other than those according to the invention are used, products with reduced thermostability are obtained.

The thermostability determined on the bases of the "colour number" runs concurrently with the behaviour of these polymers when producing spinning solutions with for example dimethylformamide as solvent, and also with the spinning of such solutions and the change in colour tone of filaments under the action of heat.

Thus, from the polymer according to experiment 18, pure white fibres, which are still practically unchanged even after heating for 3 hours at 140° C. in air, are obtained. In contrast, polymers according to experiments 12–17 produce filaments which are yellowed to a greater or lesser degree when they are spun under the same experimental conditions. If the filaments are heat-treated in the same manner, they show a strong yellowish discoloration.

*Example 4*

24 litres of salt-free water, 27 g. of sodium acetate, 400 cc. of a normal sulphuric acid and 2.25 g. of oxalic acid are placed in a 40-litre vessel made of V4A steel and provided with a stirrer mechanism. The solution is heated to 45° C. while stirring, the air is displaced from the vessel by means of nitrogen and thereafter 0.018 g. of copper sulphate (CuSO$_4$·5H$_2$O), 36.0 g. of potassium persulphate (in 0.5% aqueous solution) and 45.0 g. of sodium pyrosulphite (in 5% aqueous solution) are added.

A mixture of 4750 g. of acrylonitrile and 250° g. of methyl acrylate is now steadily run into the polymerization vessel for 270 minutes. After a reaction period of 90 minutes and 170 minutes, reactivation is carried out with a solution of 13.5 g. of potassium persulphate and 27.0 g. sodium pyrosulphite, each in 2000 g. of water. After completing the running in of the monomer, stirring is continued for another 30 minutes at 45° C. There are thus obtained 4630 g. of a pure white polymer with a K-value of 92.2. The thermostability, measured by the colour number test, shows a value of 4.

*Example 5*

2800 cc. of salt-free water are placed in a stainless steel stirrer-type vessel and heated to 45° C. A pH value of 3.4 is adjusted with 0.9 g. of oxalic acid. After adding 3 g. of potassium persulphate, 6 g. of sodium pyrosulphite and 0.01 g. of copper sulphate, 534.6 g. of acrylonitrile and 27.9 g. of methyl acrylate are simultaneously run in. The running-in operation is so regulated that it is completed within 250 minutes. After 90 minutes and after 170 minutes, reactivation is carried out with 1.0 g. of ammonium persulphate and 2.0 g. of sodium pyrosulphite, each in 250 g. of water. After 5 hours, there is obtained a 96% yield of a pure white polymer with the K-value 87.7 and the colour number 3–5.

*Example 6*

Experiment No. 4 of Example 1 is repeated with the only difference that in the place of 1 mmol oxalic acid there is used (a) a mixture of 0.5 mmol oxalic acid and 1 mmol of malonic acid and (b) a mixture of 0.3 mmol oxalic acid and 1.5 mmols of malonic acid. In both cases polymers are obtained which show the same good thermostability as the polymer according to Example 1, experiment 4.

*Example 7*

Experiment No. 4 of Example 1 is repeated with the only difference that the following combinations of ions are used in place of the 1 p.p.m. copper-II-ions:

(a) 0.2 p.p.m. copper-II-ions and 5 p.p.m. tin-II-ions, and (b) 0.5 p.p.m. copper-II-ions and 10 p.p.m. mercury-II-ions.

The two polymers obtained have similar good thermostabilities as the polymer of experiment 4 of Example 1.

*Example 8*

The process according to Example 4 is repeated using as monomeric starting material the following combinations:

(a) 4600 g. of acrylonitrile and 400 g. of vinylchloride,
(b) 4500 g. of acrylonitrile and 500 g. of vinyl acetate,
(c) 4800 g. of acrylonitrile and 200 g. of vinyl acetate,
(d) 4800 g. of acrylonitrile and 200 g. of vinyl sulphonic acid, and
(e) 5000 g. of acrylonitrile (without any comonomer).

Five polymers are obtained according to (a)–(e) which all exhibit a good thermostability and have a colour number between 4 and 6.

What is claimed is:

1. In the process for the production of acrylonitrile polymers by polymerizing in an aqueous medium a monomeric starting material selected from the group consisting of acrylonitrile and acrylonitrile and a monoethylenically unsaturated polymerizable monomer in proportions yielding copolymers containing at least 60% by weight of bound acrylonitrile, said aqueous medium containing a redox catalyst system at a pH-value between about 2 and 6, the improvement which comprises conducting said polymerization in the presence of (a) 0.1–10 mmol, per mol of the total amount of monomeric starting material, of a lower dicarboxylic acid selected from the group consisting of oxalic acid, malonic acid and mixtures thereof, and (b) at least one metal ion member of the group consisting of 0.05 to 20 p.p.m. of copper-II-ion, 0.1 to 40 p.p.m. of tin-II-ion, and 0.2 to 80 p.p.m. of mercury-II-ion, said amounts being based on the total amount of monomeric starting material and the selected metal ion being introduced as a water-soluble salt of said ion, conducting said polymerization at a temperature range of between 5° to 70° C. and recovering the formed acrylonitrile polymer from the aqueous medium.

2. The process of claim 1 wherein said monomeric starting material consists of acrylonitrile and methylacrylate.

3. The process of claim 1 wherein said monomeric starting material consists of acrylonitrile and vinylacetate.

4. The process of claim 1 wherein said monomeric starting material consists of acrylonitrile and vinylsulfonic acid.

5. The process of claim 1 wherein said water-soluble salt of a divalent metal is copper-II-sulfate.

6. The process of claim 1 wherein the pH-value of between about 2 and 6 of said aqueous medium is maintained by the presence of an inorganic acid selected from the group consisting of sulfuric acid and phosphoric acid.

7. The process of claim 1 wherein the redox catalyst system is potassium persulfate and sodium pyrosulfite, the lower dicarboxylic acid is oxalic acid, and the salt of a divalent metal is copper-II-sulfate.

8. The process of claim 7 wherein the pH-value of the aqueous medium is maintained in the range between 3 and 4.5 and the polymerization temperature is between 30° and 50° C.

9. The process of claim 1 wherein the salt of a divalent metal is a salt of mercury.

10. The process of claim 1 wherein the salt of a divalent metal is a salt of tin.

References Cited by the Examiner
UNITED STATES PATENTS

| | | | |
|---|---|---|---|
| 2,629,711 | 2/53 | Stanin et al. | 260—85.5 |
| 2,688,608 | 9/54 | Weinstock | 260—85.5 |
| 2,775,579 | 12/56 | Erchak et al. | 260—88.7 |

JOSEPH L. SCHOFER, *Primary Examiner.*

LOUISE P. QUAST, DONALD E. CZAJA, *Examiners.*